Jan. 8, 1929.
J. FULENWIDER ET AL
1,698,434
BRICK SIDING MACHINE
Filed June 26, 1926
2 Sheets-Sheet 1
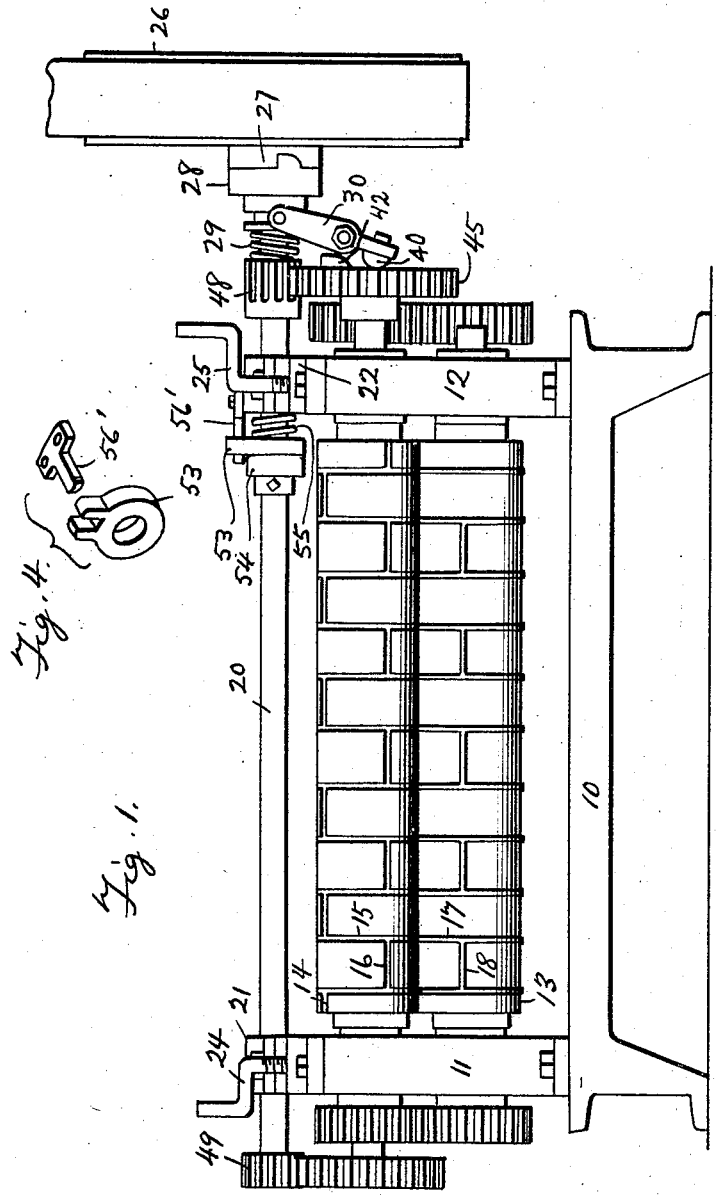
Jesse Fulenwider
Harry Fulenwider
Edward W. Robinson
Harry Norris.
INVENTORS
BY *Victor J. Evans*
WITNESS: *Gerald Hennesy*
ATTORNEY

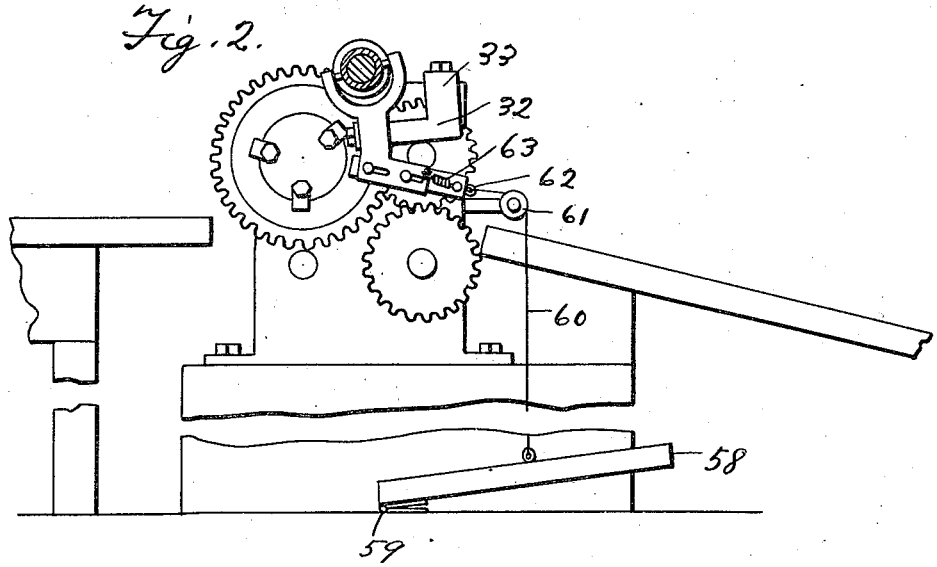
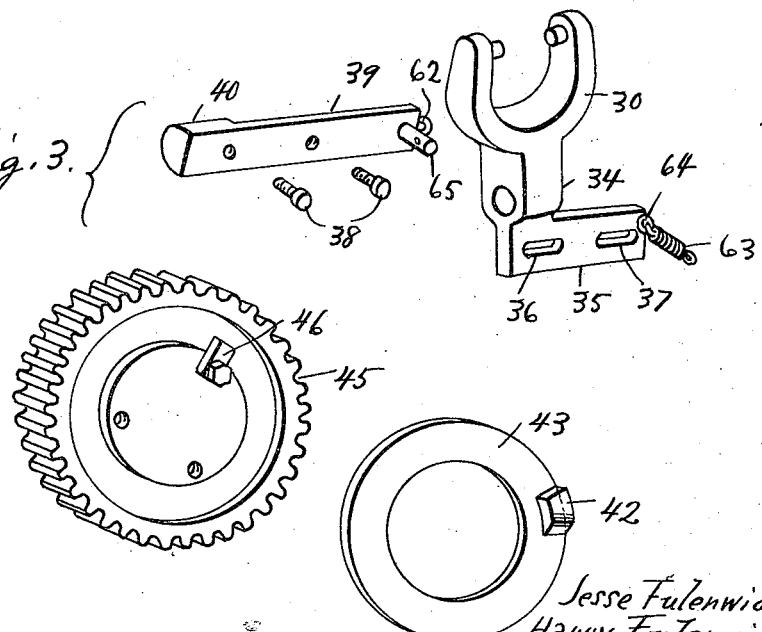

Patented Jan. 8, 1929.

1,698,434

UNITED STATES PATENT OFFICE.

JESSE FULENWIDER, HARRY FULENWIDER, EDWARD WILLIAM ROBINSON, AND HARRY NORRIS, OF SAVANNAH, GEORGIA, ASSIGNORS TO SAID JESSE FULENWIDER AND SAID HARRY FULENWIDER.

BRICK-SIDING MACHINE.

Application filed June 26, 1926. Serial No. 118,720.

The object of this invention is to provide means for automatically throwing out a clutch by means of which the rolls of a machine of the character indicated are controlled, so that the rotation of the rolls may be discontinued at predetermined intervals.

A further object is to effect this result by providing one of the gear wheels through which the drive for the rolls is imparted, with an adjustable device carrying a cam, this cam engaging a device carried by a pivoted yoke, which in turn operates an element of the clutch.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 is a view of the machine in elevation.

Figure 2 is an elevation from another angle.

Figure 3 shows, in perspective, detached elements by means of which the clutch is controlled.

The base of the machine is designated 10, and carried thereby are standards 11 and 12 in which the rolls 13 and 14 are mounted.

These rolls are designed to form beads or the like in blanks of sheet metal, in imitation of brick work. The roll 13 therefore includes annular beads 17 and ribs 18 connecting the beads, these elements 17 and 18 cooperating with grooves 15 and 16 in roll 14. It is obvious that this arrangement may be reversed, and that the beads may be carried by the other rolls.

A shaft 20 is mounted in bearings 21 and 22, the bearings being adjustable by crank elements 24 and 25, and this shaft is driven from pulley wheel 26, the hub portion of which constitutes a clutch element 27, with which slidable clutch element 28 is adapted to cooperate. The element 28 is controlled in part by a spring 29 encircling the shaft 20, and is further controlled by a yoke 30 mounted on an arm 32 of stationary brackets 33.

The yoke 30 includes a stem 34 and a laterally extending portion 35 provided with slots 36 and 37, thru which screws 38 are adapted to pass, these screws entering bar 39 carrying lug 40. Bar 39 is therefore adjustable or slidable in view of the mounting thereof, just referred to, and the lug 40 is engaged by cam 42 of ring 43, the element last named being mounted in an annular groove or channel in one side of gear wheel 45. The ring is retained in the groove by lugs 46, and may be adjusted in order to place cam 42 in any desired position.

Clutch element 28, being splined on shaft 20, imparts drive, when the clutch is in, to the upper and lower rolls 13 and 14, thru gear wheels 48 and 49, and the gearing shown conventionally at the right and left of Figure 1, the particular elements involved in the train of gearing not being claimed.

Shaft 20 and the rolls 13 and 14 are retarded when the clutch is thrown out by mounting the slotted collar 53 of Figure 4 loosely on the shaft, this collar being held against stationary collar 54 by spring 55.

The slotted collar is engaged by a lug 56', and rotation of the collar is therefore prevented, but the frictional contact provided between collar 53 and stationary collar 54 is sufficient to prevent operation by reason of momentum after the power is cut off.

A foot lever 58 is pivoted at 59, and a flexible device 60, connected with the lever intermediate of its ends, passes over pulley 61, and is secured at 62. Spring 63 is secured at 64 and 65, and holds bar 39 in position and element 40 thereof will normally be in operative position with reference to cam 42, but said elements 39 and 40 are adapted to be controlled by pedal or foot lever 58.

It will be observed from the construction disclosed, that the clutch will be thrown out automatically when the rolls have turned thru a predetermined angle, and that engaging device 40 may be moved out of the path of cam 42 at the will of the operator by shifting the position of bar 39 on bar 35, and may be temporarily thrown out by swinging yoke 30, manually, on its pivot.

We claim—

1. In a machine of the character described, a plurality of forming rolls, a driving shaft, gearing thru which the rolls are driven by the shaft, a slidable clutch element on the shaft, a driving pulley on said shaft, the pulley including a clutch element cooperating with that first named, a pivoted member for releasing the slidable clutch element, a rotatable cam driven in timed relation to the rolls, said pivoted member including a laterally offset slotted arm and a slidable device on the arm including a cam engaging lug, this device on the arm when engaged operating said pivoted member and releasing the clutch, and means for mounting the cam for adjustment angularly of its path of rotation.

2. In a machine of the character described, a plurality of forming rolls, a driving shaft, gearing thru which the rolls are driven by the shaft, a slidable clutch element on the shaft, a driving pulley on said shaft, the pulley including a clutch element cooperating with that first named, a pivoted member for releasing the slidable clutch element, a rotatable cam driven in timed relation to the rolls, circumferentially channeled means mounting the cam, and a device on the pivoted member in the path of movement of the cam, this device when engaged operating said pivoted member and releasing the clutch, stationary means and cooperating rotatable friction means on the driving shaft for retarding this shaft when the clutch is released, and means for moving the engaging device out of the path of the cam.

In testimony whereof we affix our signatures.

JESSE FULENWIDER.
HARRY FULENWIDER.
EDWARD W. ROBINSON.
H. NORRIS.